Sept. 29, 1959  K. P. SWANSON  2,905,978
TEXTILE DRAFTING ROLL ASSEMBLY
Filed June 29, 1956
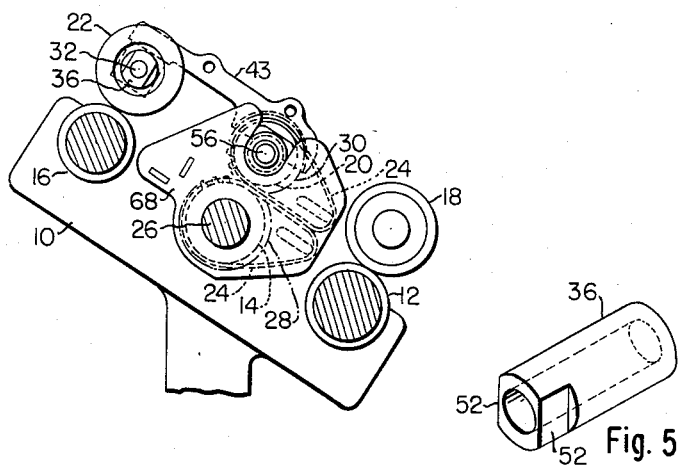
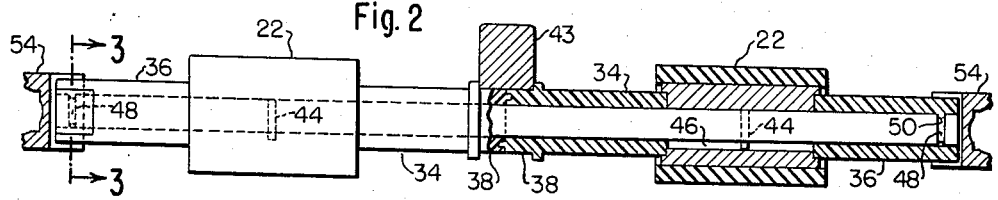
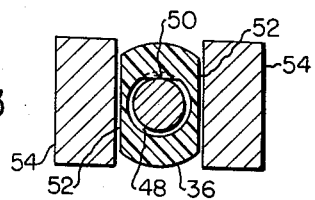 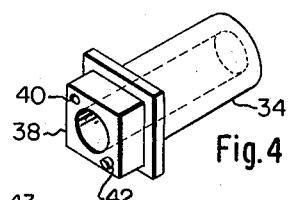
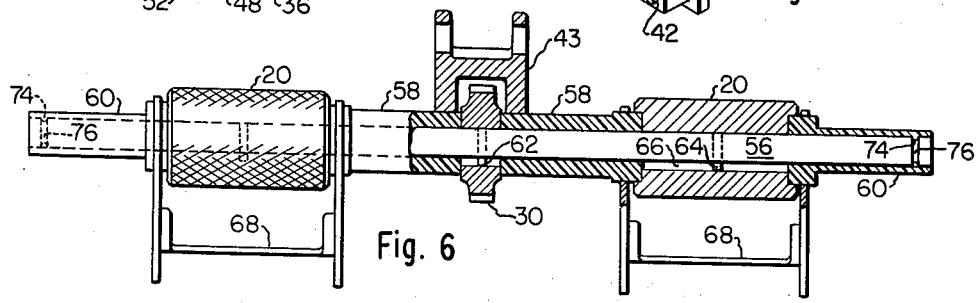
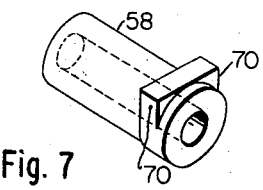 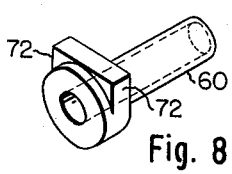
*INVENTOR.*
KENNETH P. SWANSON
BY
*Kenway, Jenney, Witter & Hildreth*
ATTORNEYS

United States Patent Office 2,905,978
Patented Sept. 29, 1959

---

2,905,978

TEXTILE DRAFTING ROLL ASSEMBLY

Kenneth P. Swanson, Abington, Mass.

Application June 29, 1956, Serial No. 594,767

6 Claims. (Cl. 19—142)

This invention relates to a new and improved textile drafting roll assembly wherein the usual rotary bearings at the ends of the assembly shafts are eliminated, thereby more efficiently supporting the rolls for rotation and precluding the troublesome gathering of lint and other foreign material in such bearings. My improved construction supports the rolls on a rotary shaft in turn rotatably supported within non-rotary sleeve bearings of synthetic resinous materials having a low coefficient of friction and requiring no lubrication, the rolls thereby being the only exposed rotary portion of the unit. The production of a novel and improved assembly of this nature comprises the primary object of the invention.

A further feature of the invention relates to the novel construction in which the parts can be quickly and conveniently assembled on or disassembled from the shaft and furthermore to novel detents integral with the end sleeve bearings and normally engaged in annular grooves in the shaft for retaining the parts in assembled relation, the sleeves with their detents being molded from resilient material and being removable merely by manually forcing the sleeves outwardly axially of the shaft. The sleeves are furthermore provided with oppositely disposed flats for engagement by supporting elements preventing rotation of the sleeves.

A further embodiment of the invention includes a driving gear on the shaft and connected thereto for driving rotation by a shear pin carried by the shaft and extending into a keyway in the gear, the pin being adapted to shear and thus prevent damage if and when abnormal driving force is applied thereto. In such event the assembly is removed and quickly repaired merely by sliding the sleeves and other elements from the shaft and replacing the broken pin with a new pin. The production of an assembly having these and other novel features hereinafter more specifically described comprises a further object of the invention.

These and other features of the invention will be more readily understood and appreciated from the following detailed description of preferred embodiments thereof selected for purposes of illustration and shown in the accompanying drawing in which:

Fig. 1 is a fragmentary side elevation of a roving or spinning frame employing the invention, Fig. 2 is an elevation, partially in longitudinal section, of a drafting roll assembly embodying the invention, Fig. 3 is an enlarged sectional view taken on line 3—3 of Fig. 2, Fig. 4 is a perspective view of a sleeve bearing shown in Fig. 2, Fig. 5 is a perspective view of another sleeve bearing shown in Fig. 2, Fig. 6 is an elevation, partially in longitudinal section, of a roll assembly embodying the invention, and Figs. 7 and 8 are perspective views of sleeve bearings shown in Fig. 6.

The spinning frame 10 shown in Fig. 1 of the drawing illustrates the usual three bottom driving rolls, including a front roll 12, an intermediate roll 14 and a back roll 16, all driven by suitable mechanism. Cooperating with the bottom rolls are three top rolls, including a front roll 18, intermediate roll 20 and back roll 22. Disposed on the intermediate rolls 14 and 20 are the usual cooperating endless belts or aprons 24. The roll 14 is mounted on a driven shaft 26 having a driving gear 28 thereon adapted to cooperate with and drive a gear 30 also illustrated in Fig. 6. My invention herein more particularly concerns a novel and improved roll assembly especially adapted for use in providing the intermediate and back rolls shown at 20 and 22.

In Figs. 2–5 I have illustrated a back roll assembly constructed in accordance with my invention. The assembly comprises a shaft 32 having mounted thereon an intermediate sleeve, preferably constructed in two like cooperating portions 34, two rolls 22 and two end sleeves 36. The two sleeve portions 34 (Fig. 4) are symmetrical, each having at one end a square portion 38 with a hole 40 and a lug 42 at the end face. Each lug is adapted to engage within the hole of the companion portion and thus lock the two sleeve portions together and the square portions are adapted to be engaged by opposed fingers on one end of a saddle 43 and thereby prevent rotation of the sleeve.

Each roll 22 is keyed to the shaft 32 by a removable pin 44 disposed in a hole diametrically through the shaft and having one end projecting outwardly into a keyway 46 through the roll. The sleeves 34 and 36 are molded from synthetic resinous material, such as nylon, which has a low coefficient of friction and requires no lubrication. The shaft is grooved annularly at 48 adjacent to each end and each sleeve has a detent 50 integral therewith at one side thereof as shown in Fig. 3 and adapted to engage resiliently within the adjacent portion of the groove, thus confining the parts in working position on the shaft as illustrated in Fig. 2. The molded sleeves are sufficiently resilient to permit displacement of the detents from the adjacent portions of the grooves upon forced movement of the sleeves outwardly at the ends of the shaft. The outer end of each sleeve 36 is also provided with opposed flats 52 for engaging within cap bars 54, thereby supporting the assembly against lateral movement but permitting free vertical movement.

In Figs. 6–8 I have illustrated an intermediate roll assembly constructed in accordance with my invention. This assembly comprises a shaft 56 having mounted thereon a gear 30, two sleeves 58 at opposite sides of the gear, two apron driving rolls 20, and two end sleeves 60. The gear is keyed to the shaft by a removable shear pin 62 of relatively soft metal disposed in a hole diametrically through the shaft and having one end projecting outwardly into a keyway through the gear. Each roll 20 is likewise keyed to the shaft by a relatively hard removable pin 64 extending from the shaft into a keyway 66 through the roll.

The sleeves 58 and 60 are molded in like manner as the sleeves 34 and 36 and each has a molded end to fit within a cradle 68, as illustrated in Fig. 1, and including flats 70 and 72 preventing rotation of the sleeves in the cradles. The outer sleeves 60 are also provided with integral detents 74 for engaging within annular grooves 76 in the shaft. The saddle 43 is adapted to bridge the gear 30 and rest on the sleeves 58 as illustrated in Fig. 6.

The cylindrical surfaces of the rolls 20 are knurled to provide a driving grip on the apron 24 and are driven from the shaft 26 through the gears 28 and 30. Should some obstacle place an abnormal load on this drive to the rolls 20, the pin 62 shears and further damage is prevented. The difficulty is then corrected merely by lifting the shaft 56 assembly from the cradles, forcing one of the retaining sleeves 60 outwardly from the shaft, sliding the adjacent roll, sleeve 58 and gear outwardly along the shaft to expose the pin 62, removing the sheared pin and replacing it with a new pin.

It will now be apparent that I have provided a new and highly efficient roll assembly having many superior advantages. The assembly is relatively simple, economical to produce and can be serviced with great speed and efficiency. The only exposed moving parts are the operating rolls 20 and 22 and the assembly is supported on the shaft within the molded sleeve bearing and requires no lubrication. The parts are assembled and disassembled merely by sliding them onto and from the shaft and are releasably held in assembled relation by the novel end bearing sleeves with detents cooperating with the annular grooves in the shaft. The back roll assembly rests by its own weight on the rolls 16 and is maintained in position by the cap bars 54. The driven assembly shown in Fig. 6 is likewise equally efficient and conveniently superior protection and servicing are provided by my novel assembly including the shear pin arrangement for the gear 30.

Having thus disclosed my invention what I claim as new and desire to secure by Letters Patent is:

1. A textile drafting roll assembly, comprising a cylindrical arbor, two drafting rolls mounted in spaced relation on the arbor, keys in the arbor extending into keyways disposed longitudinally through the rolls, tubular means on the arbor between and maintaining the rolls in spaced relation and having a cylindrical bore therethrough receiving and fitting the arbor, and two bearing sleeves on the arbor end portions extending outwardly beyond the rolls and each having diametrically opposed and parallel flats at one end, the arbor being annularly recessed therearound adjacent to one end and the bearing sleeve thereon being of resilient composition and having a detent integral therewith at one side thereof and disposed resiliently to engage within the adjacent portion of the recess and to disengage therefrom upon forced longitudinal movement of the bearing sleeve relative to the arbor.

2. The drafting roll assembly defined in claim 1 in which said tubular means comprises two sleeves in end to end abutting engagement and each having at its abutting end an integral lug extending into a conforming hole in the other sleeve.

3. The drafting roll assembly defined in claim 1 in which said tubular means includes two sleeves, a gear on the arbor between the sleeves, and a shear pin carried by the shaft and extending into a keyway disposed longitudinally through the gear.

4. A textile drafting roll assembly, comprising a cylindrical arbor, two drafting rolls mounted in spaced relation on the arbor, keys in the arbor extending into keyways disposed longitudinally through the rolls, means including two sleeves and a gear therebetween on the arbor between and maintaining the rolls in spaced relation, a shear pin carried by the shaft and extending into a keyway disposed longitudinally through the gear, and two bearing sleeves on the arbor end portions extending outwardly beyond the rolls and each having diametrically opposed and parallel flats at one end.

5. The drafting roll assembly defined in claim 4 in which the ends of the sleeves adjacent to the rolls have diametrically opposed and parallel flats, and two cradles each disposed at one of said rolls and having sockets receiving and supporting the sleeve ends adjacent thereto and in contact with said flats.

6. A textile drafting roll assembly, comprising a cylindrical arbor, two drafting rolls mounted in spaced relation on the arbor, keys in the arbor extending into keyways disposed longitudinally through the rolls, tubular bearing means on and cylindrically fitting the arbor between and maintaining the rolls in spaced relation and having diametrically opposed flats thereon, two bearing sleeves on the arbor end portions extending outwardly beyond the rolls and each having diametrically opposed and parallel flats at one end, said tubular bearing means and bearing sleeves being constructed of synthetic resinous material and requiring no lubrication, and means cooperating with said flats to prevent rotation of the bearing means and sleeves, the arbor being annularly recessed therearound adjacent to one end and the bearing sleeve thereon being of resilient composition and having a detent integral therewith at one side thereof and disposed resiliently to engage within the adjacent portion of the recess and to disengage therefrom upon forced longitudinal movement of the bearing sleeve relative to the arbor.

References Cited in the file of this patent

UNITED STATES PATENTS

| | | |
|---|---|---|
| 2,037,836 | Truslow | Apr. 21, 1936 |
| 2,256,193 | Cobb | Sept. 16, 1941 |
| 2,618,025 | De Santis | Nov. 18, 1952 |
| 2,671,934 | Rulon-Miller | Mar. 16, 1954 |
| 2,700,191 | Naegeli | Jan. 25, 1955 |

FOREIGN PATENTS

| | | |
|---|---|---|
| 502,642 | Belgium | May 15, 1951 |